United States Patent [19]

Sepke

[11] Patent Number: 4,987,681
[45] Date of Patent: Jan. 29, 1991

[54] HAND HELD CORDLESS GRASS/WEED TRIMMER

[75] Inventor: Arnold L. Sepke, Hudson, Ill.

[73] Assignee: White Consolidated Industries, Inc., Cleveland, Ohio

[21] Appl. No.: 264,389

[22] Filed: Oct. 31, 1988

[51] Int. Cl.⁵ .............................................. B26B 25/00
[52] U.S. Cl. ....................................... 30/276; 30/347; 200/505; 200/535
[58] Field of Search ................. 30/272 R, 276, 347, 30/286, 233, 240, 285, 296 R; 56/12.7, 295; 200/283, 505, 535

[56] References Cited

U.S. PATENT DOCUMENTS

| | | | |
|---|---|---|---|
| 2,883,746 | 4/1959 | Gilsi | 30/276 |
| 3,971,130 | 7/1976 | Querfurth et al. | 30/220 |
| 4,200,978 | 5/1980 | Irelan et al. | 30/276 |
| 4,259,782 | 4/1981 | Proulx | 30/276 |
| 4,412,382 | 11/1983 | White | 30/276 |
| 4,660,286 | 4/1987 | Engelbrecht et al. | 30/276 |
| 4,736,573 | 4/1988 | Seck | 30/276 |

Primary Examiner—Douglas D. Watts
Assistant Examiner—Hwei-Siu Payer
Attorney, Agent, or Firm—Hubbard, Thurman, Turner, Tucker & Harris

[57] ABSTRACT

A hand-held cordless grass/weed trimmer having a plurality of detachable hub assemblies holding the cutting element by compression, and a rake-like guard member for the rotating cutting element which prevents large size obstacles from entering into the cutting path.

14 Claims, 9 Drawing Sheets

HAND HELD CORDLESS GRASS/WEED TRIMMER

The present invention relates to a device for cutting and trimming grass and weeds or bushes and evergreen trees, which is compact, quiet, light weight, maneuverable, and hand held. The trimmer is designed to incorporate thermoplastic filament lines for example, nylon, or a rotating blade, and a guard member to reduce, or eliminate, the possibility of injury when operating the device.

BACKGROUND OF THE INVENTION

Hand-held grass trimmers are known, such as shown and described in U.S. Pat. No. 3,971,130 as well as German Patent No. De2,718,355, U.S. Pat. No. 4,202,094 to Kalmar and U.S. Pat. No. 4,641,431 to Leming et al. U.S. Pat. No. 3,971,130 and the German Patent No. De 2,718,355 both relate to a scissors type of grass and weed trimmer while U.S. Pat. No. 4,202,094 relates to a rotating flexible mono filament arrangement attached to a hand drill. U.S. Pat. No. 4,641,431 is directed to a hand-held electric hedge trimmer using a wire whip.

The present invention is directed to an improvement over the prior art constructions in both operation and safety and utilizes either a flexible line, such as a filament nylon line, or a rotating blade.

It is an object of the present invention to provide a full circle guard for the rotating flexible line or cutter blade which results in an improved safety for the operator as well as any person or thing in the vicinity of the trimming activity.

It is another object of the present invention to provide a hand-held grass/weed trimmer which makes it possible to accomplish precise trimming without cutting plants and shrubbery adjacent thereto.

It is still another object in the present invention to provide a guard member which prevents objects such as rocks, stone walls and, posts from entering into the area of the cutting line or cutter, thus abrading and severing the cutting member, and necessitating time consuming and costly replacement.

Another object of the present invention is to provide a full circle guard member which reduces the hazard of damage or injury to the operator or other persons caused by inadvertently propelling stones, rocks and other debris beyond the confines of a guard wall. Additionally, the configuration of the guard with spaced tines having rather limited openings therein prevents objects with relatively large masses from entering into the cutting area, and being propelled out of the guard with considerable force to strike a person, or persons, in the vicinity.

A further object of the present invention is to provide the full circle guard arrangement for a hand-held grass/weed trimmer in which a portion of the guard can be removed for up-to-the-edge trimming when using the device in connection with a nylon line cutting member.

Another feature of the present invention is to provide plurality of variations in detachable hub designs for removably securing either a flexible cutting line or a rigid cutting blade to the hub. The attachment to the motor shaft is accomplished by both mechanical interlock as well as a slight distortion of a slightly resilient retainer cap caused by an interference fit when it meets with a mounting hub and traps the cutting member under compression pressure.

In order that the present invention will be more clearly understood, it will now be disclosed in greater detail with reference to the accompanying drawings in which.

Figure 5:
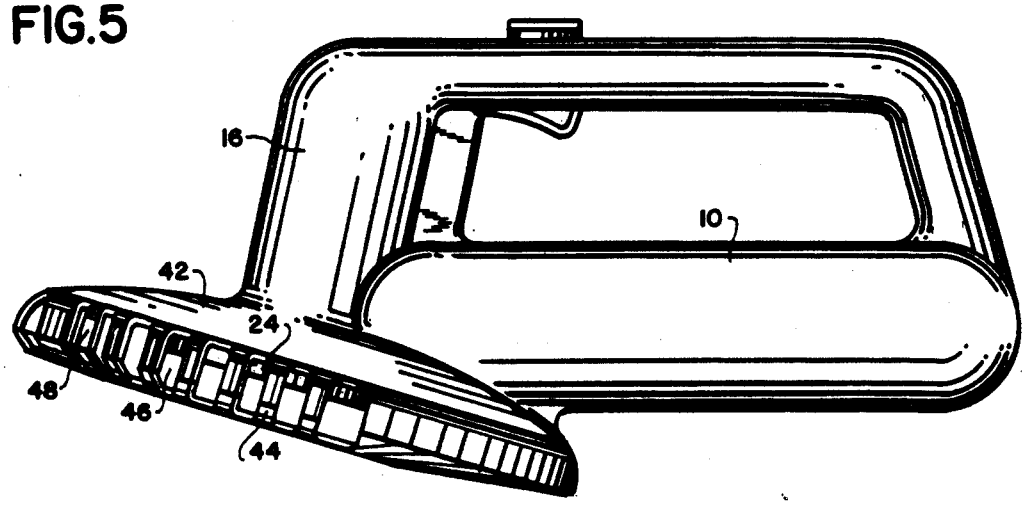
FIG. 5 is a side elevational view of an alternate embodiment to the present invention in which the grass/weed trimmer is fabricated in two complimentary halves with an additional accessory guard and are molded of thermoplastic material.
Figure 6:
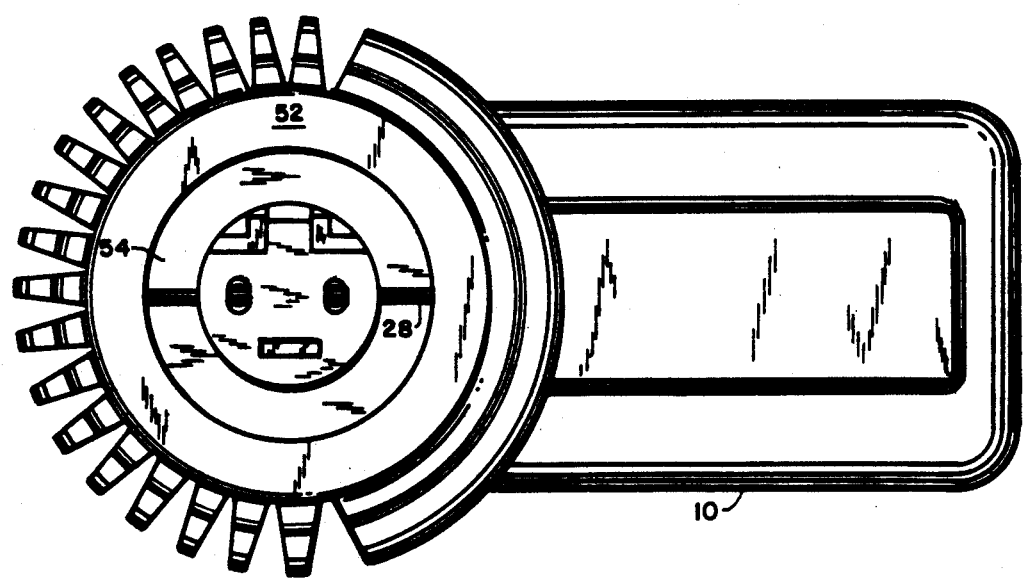

FIG. 6 is a bottom plan view. As seen in FIGS. 5 and 6, the two halves of the grass/trimmer body form a full guard providing 360 degree protection, which is molded as an intergal part of the trimmer casing. As seen in FIG. 6 an additional accessory guard is mounted to the bottom of the cutting chamber to further inhibit the penetration in the cutting area where objects are not required to be cut or trimmed.

Figure 7:
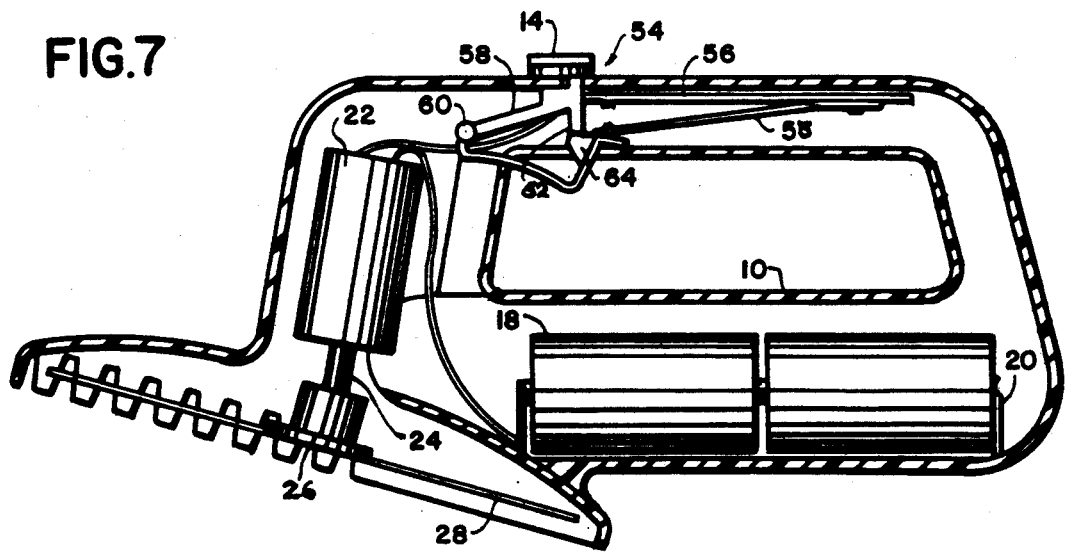

FIG. 7 is a partial elevation and partional sectional view of the hand held grass/weed trimmer showing the lock-out switch.

Figure 8:
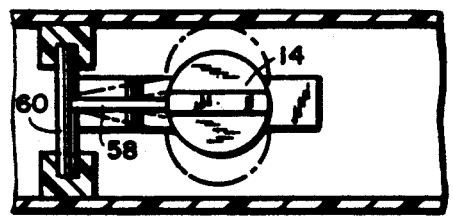

FIG. 8 is a partial plan view of the switch activator shown in FIG. 7.

Figure 9:
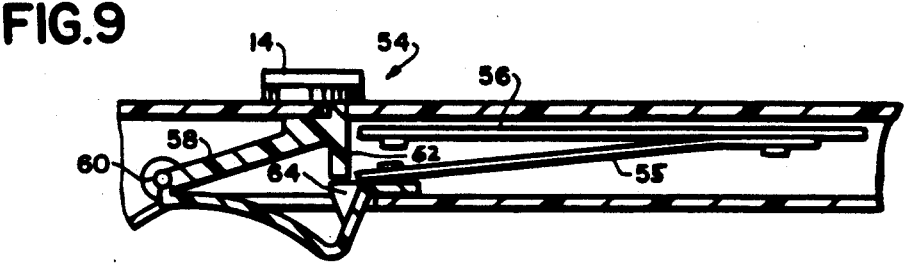

FIG. 9 is an enlarged sectional view showing the switch, switch activator in the open position.

Figure 10:
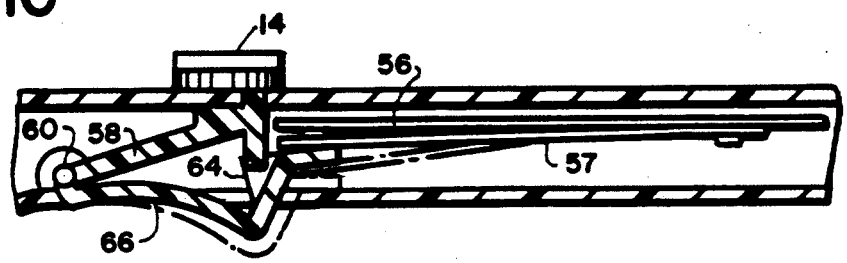

FIG. 10 is an enlarged sectional view similar to FIG. 9 showing the switch activator and switch in the closed position.

Figure 11:
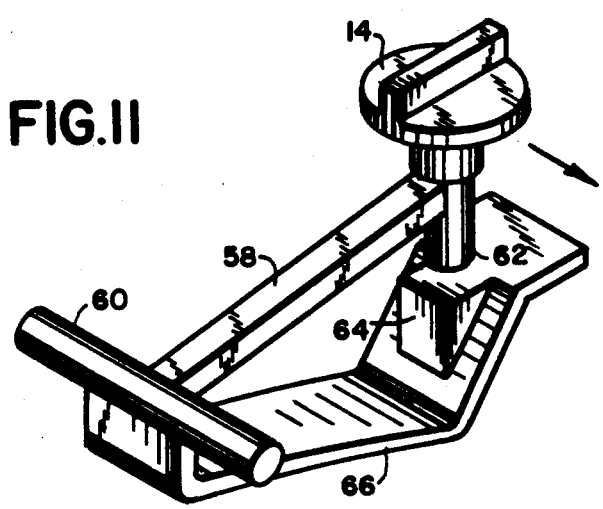

FIG. 11 is a perspective view of the switch activator in its lock-out position.

Figure 12:
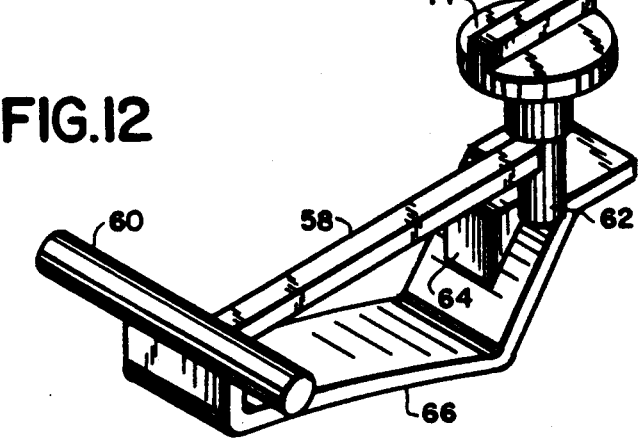

FIG. 12 is a perspective view showing the switch activator in its make position.

Figure 13:
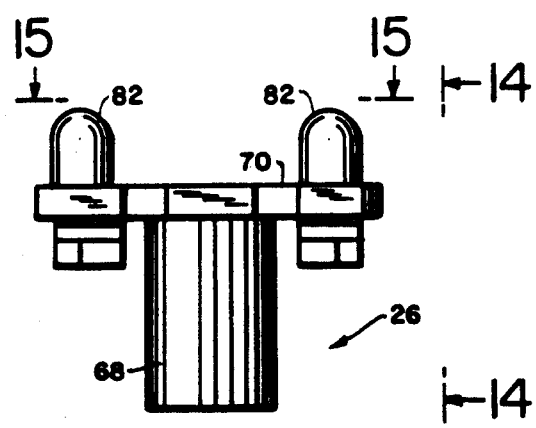

FIG. 13 is a side elevational view of the hub attachment of the grass/weed trimmer without the top retainer cap, and constructed in accordance with the teachings of the present invention.

Figure 14:
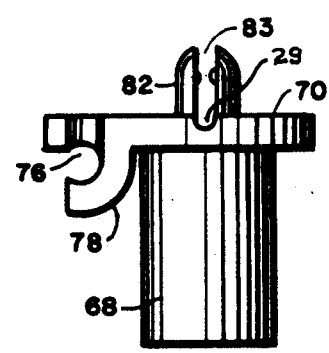

FIG. 14 is a side elevational view of the structure shown in FIG. 13.

Figure 15:
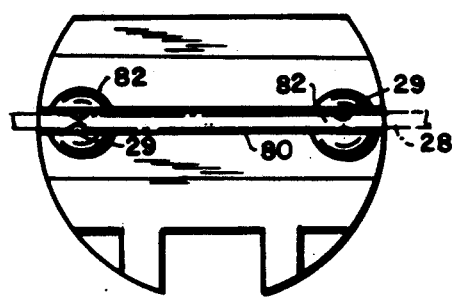

FIG. 15 is a top plan view thereof.

Figure 16:
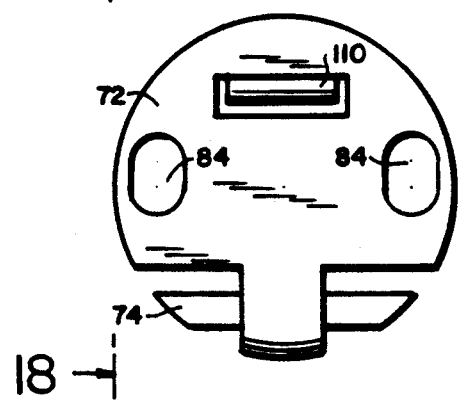

FIG. 16 is a top plan view of the cap closure to be mated to hub of FIGS. 13, 14, 15.

Figure 17:
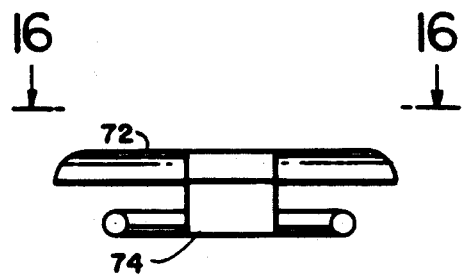

FIG. 17 is a rear plan view of the top retainer cap.

Figure 18:
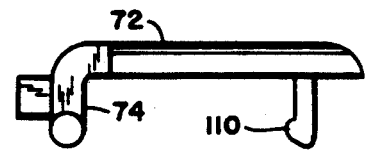

FIG. 18 is a side elevational view of the structure shown in FIG. 16.

Figure 19:
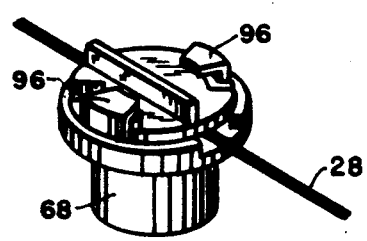

FIG. 19 is a perspective view of a mounting hub assembly showing a nylon filament line therein.

Figure 20:
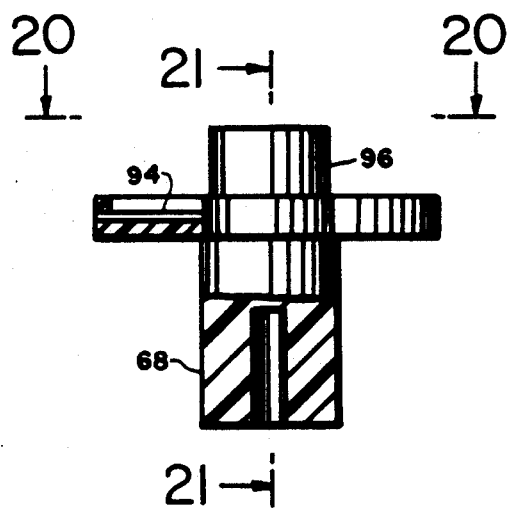
Figure 21:
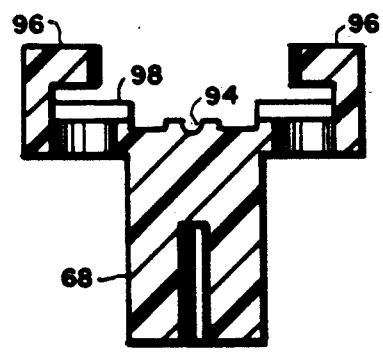

FIGS. 20 and 21 are sectional views of a hub design utilizing a two piece construction in which the mounting hub is shown in a sectional view in FIG. 20 and along the lines 20—20 with regard to FIG. 21.

Figure 22:
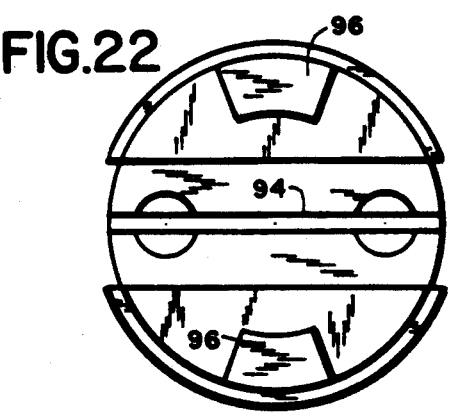

FIG. 22 is a top plan view in the mounting hub.

Figure 23:
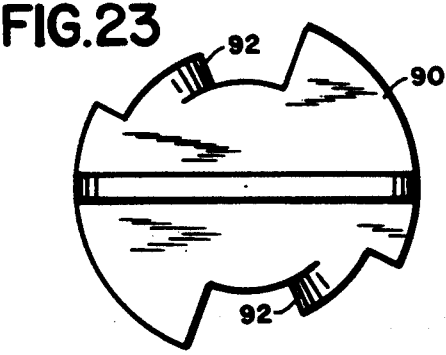

FIG. 23 is a rotating cap which mates to said mounting hub which is provided to retain either a nylon string filament line, or blade, as seen in construction of FIGS. 20, 21 and 22.

Figure 24:

FIG. 24 is a side elevational view of the rotating retainer cap.

Figure 25:

FIG. 25 is a front elevational view of the retainer cap of FIG. 24 showing a ramp for the rotating cap.

Figure 26:
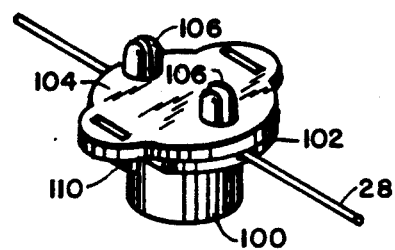

FIG. 26 is a perspective view of an alternate embodiment of the hub design of the present invention.

Figure 27:
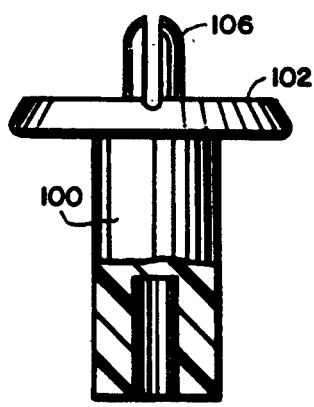

FIG. 27 is an enlarged view of FIG. 26 partly in section and partly in elevation.

Figure 28:
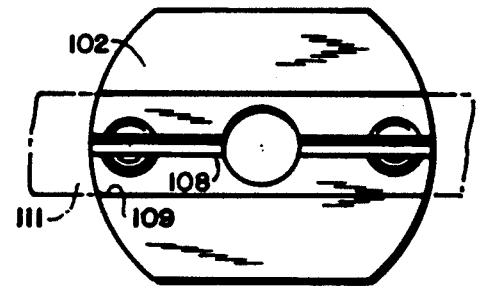

FIG. 28 is a top plan view of the mounting hub shown in FIG. 27.

Figure 29:
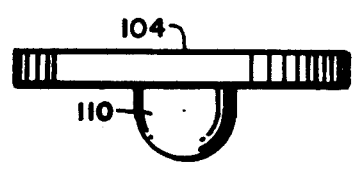

FIG. 29 is a side elevational view of the retainer cap.

Figure 30:
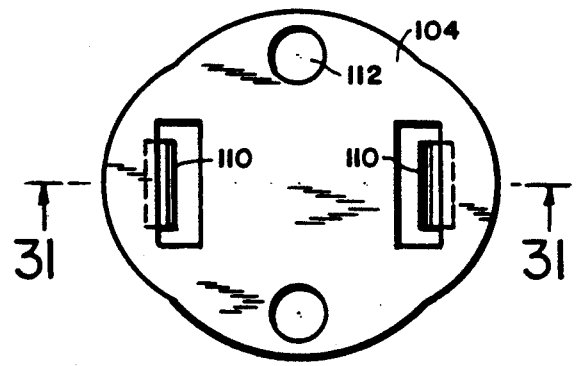
Figure 31:
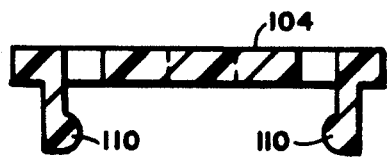

FIG. 30 is a top plan view of the mounting hub and the retainer cap and,

FIG. 31 is a side elevational view of the retainer cap.

Figure 32:
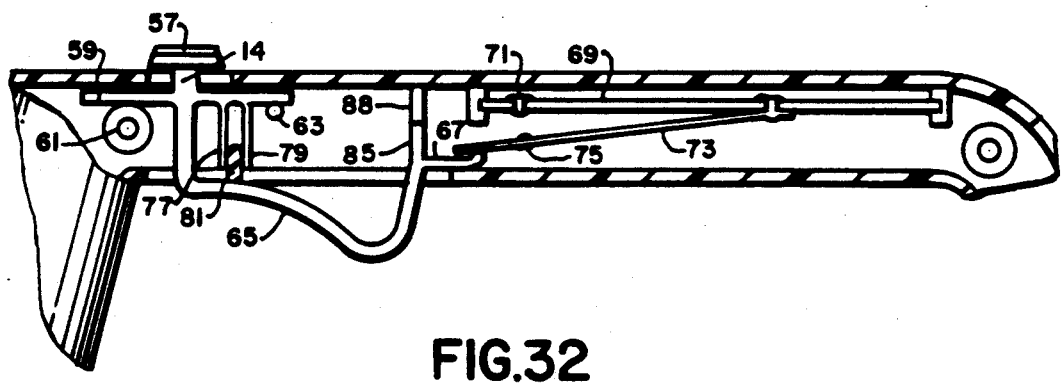

FIG. 32 is a partial side elevational view and cross-sectional view of an alternate switch arrangement shown in FIG. 7

Figure 33:
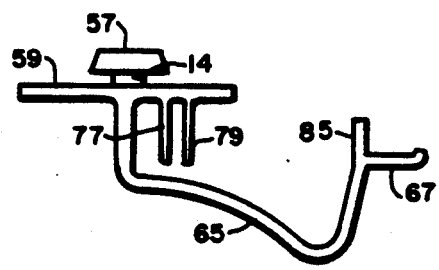

FIG. 33 is a side elevational view of the switch activator

Figure 34:
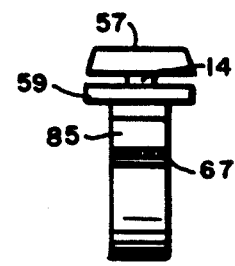

FIG. 34 is a front elevational view thereof

Figure 35:
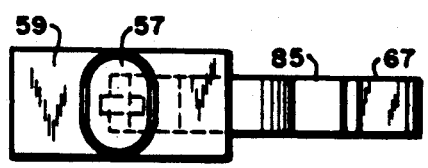

FIG. 35 is a top plan view thereof and

Figure 36:
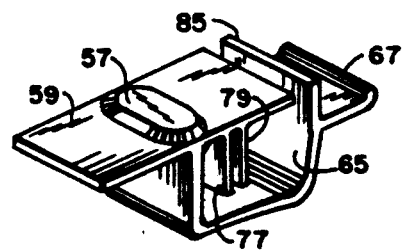

FIG. 36 is a perspective view thereof

DESCRIPTION OF THE PREFERRED EMBODIMENTS

Figure 1:
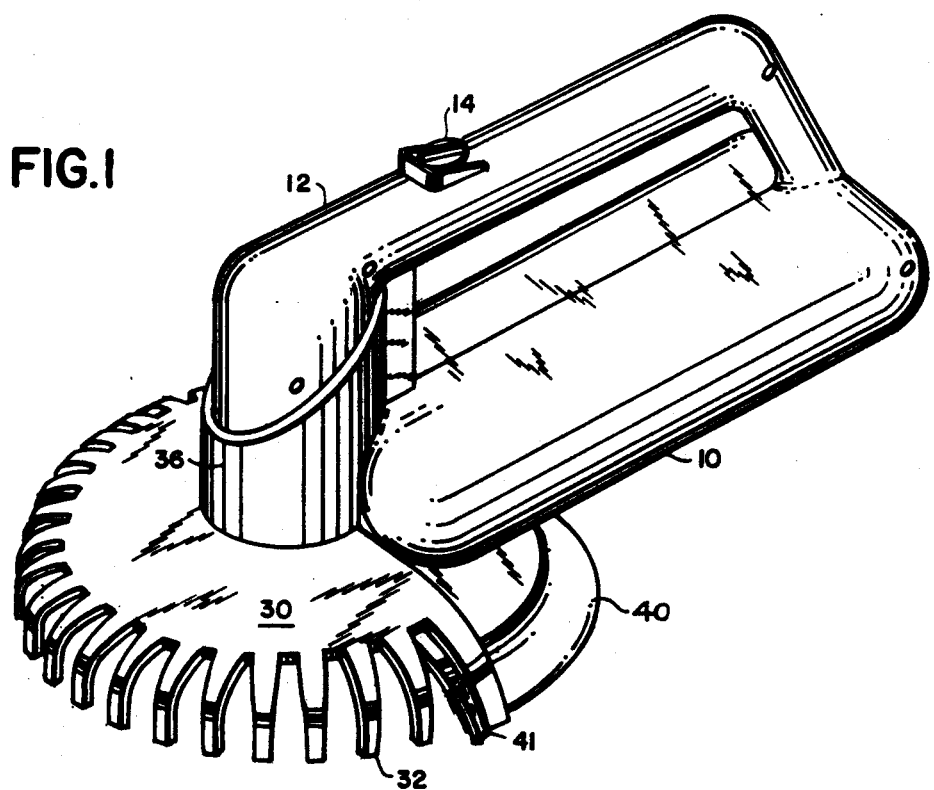
FIG. 1 is a perspective view of a hand-held cordless grass/weed trimmer constructed in the accordance with the teachings of my invention.
Figure 2:
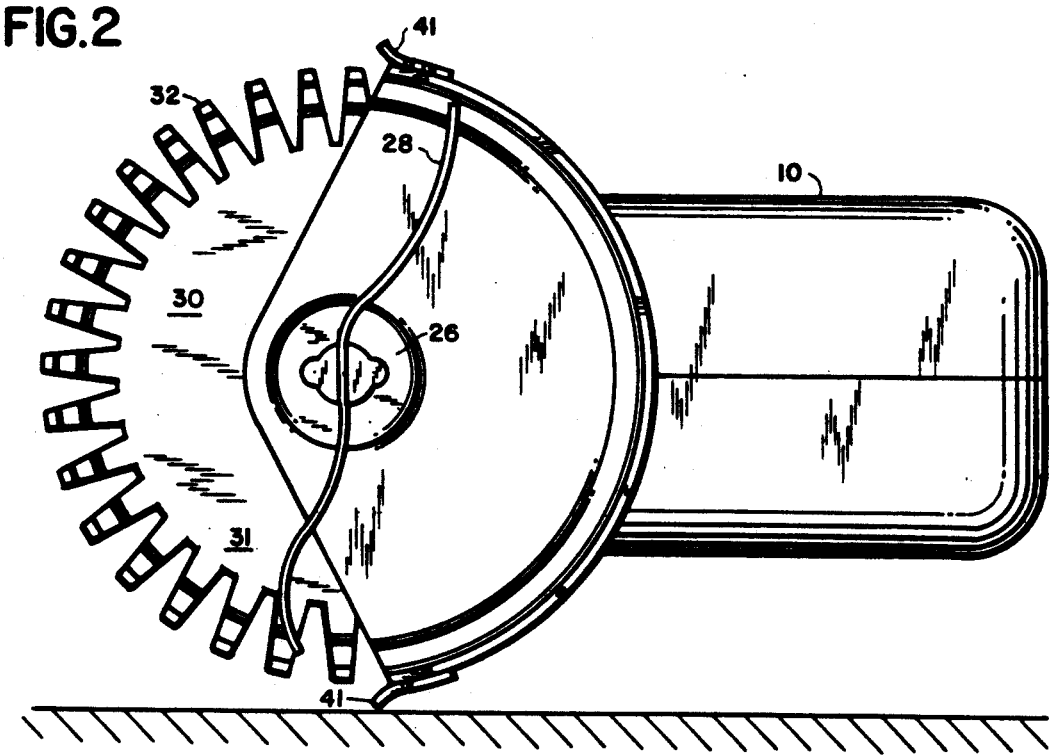
FIG. 2 is a bottom plan view thereof showing a plastic filament line used as a cutting device.

FIGS. 1-4 illustrate my hand-held cordless grass-/weed trimmer device constructed in accordance with the teachings of the present invention. The trimmer device shows a housing or casing 10 having a handle portion 12 provided with an on/off switch 14 and a motor housing portion 16. As seen in FIG. 7, a plurality of cells which comprise a battery or a single battary pack 18 are provided within the casing 10. Also seen in the rear of the casing 10 is a charge adapter 20 for recharging the batteries 18 through a standard AC outlet. A motor 22 is shown positioned within the motor housing 16 having a shaft 24 projecting therefrom. As seen in FIG. 7, the motor 22 is connected to the batteries 18 as a source of power through the switch 14. Attached to the motor shaft 24 are alternate hub assemblies for the cutting or trimming mechanism 26. One of such assembly is shown in FIG. 2 which will be illustrated and described more in detail hereinafter.

As seen in FIG. 2, a nylon mono-filament cutting line 28 is shown which can be utilized with the present device. It should also be apparent that since the hub assembly cap is detachable, other types of cutting devices, such as a double-edged cutting blade, can be employed in the present device, as well as the use of a cutting line 28.

Figure 3:
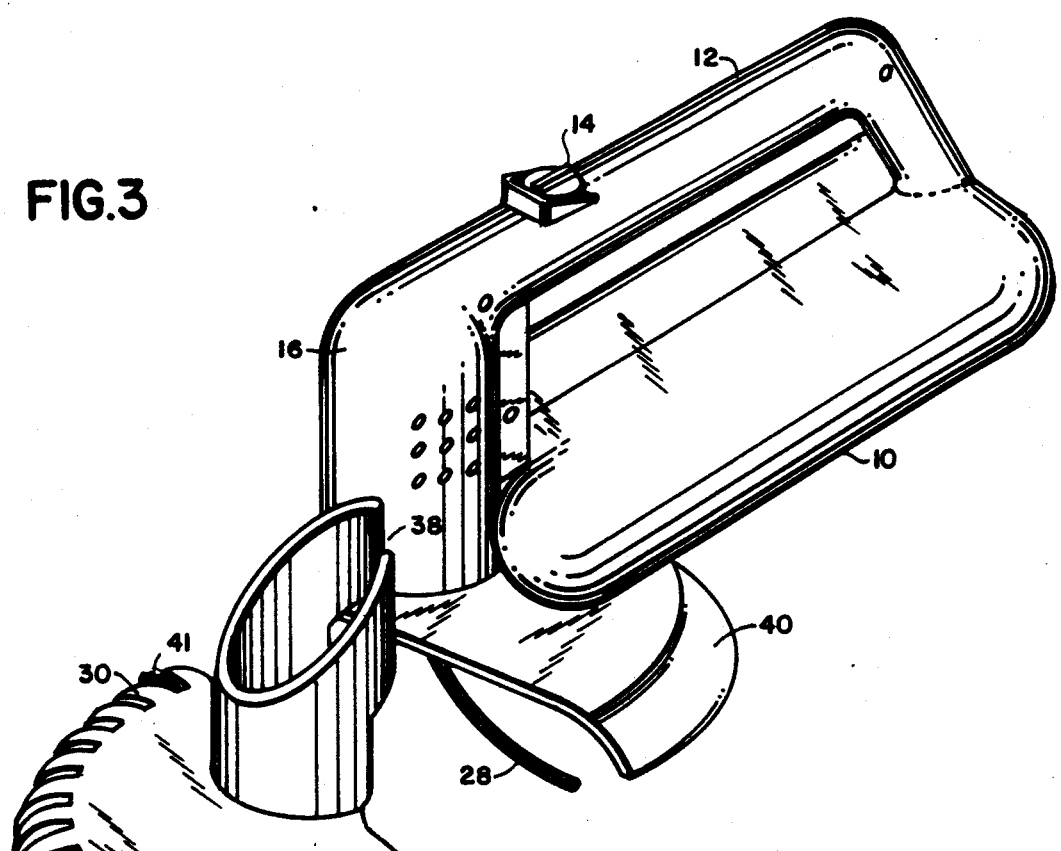
FIG. 3 is a hand-held cordless grass/weed trimmer shown in FIG. 1 with a rear guard shroud portion being integral with the trimmer body while the front guard member is detachable from the main unit.
Figure 4:
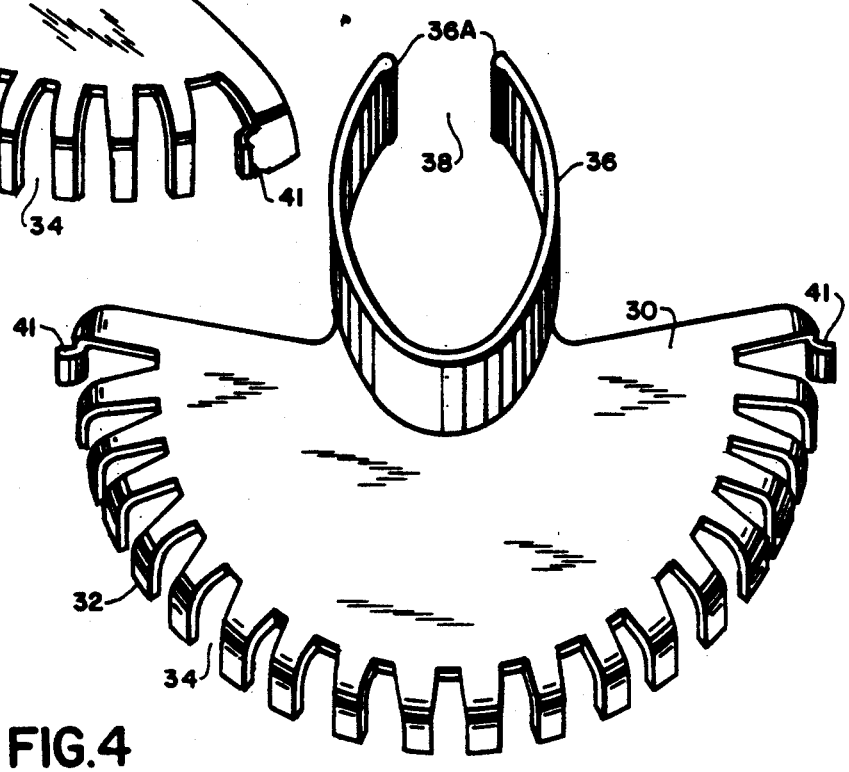
FIG. 4 is a front elevational view of the detachable front guard of the grass/weed trimmer.

The present trimmer device is provided with a detachable curvilinear front guard 30, as particularly shown in FIGS. 3 and 4 and which constitutes an arc of at least 200 degrees. The guard 30 is provided with a plurality of tines 32 having spaces 34 therebetween. Projecting upwardly from the guard 30 is a curved retaining member 36 which is shaped to conform to the outer configuration of motor housing 16. Consequently, the retainer member 36, which has an opening 38, can be snap-fitted over the motor housing 16 because of the resiliency of the free ends 36A. In observing the illustrations of FIGS. 1-4 it should be evident that the trimmer is provided with an integral rear guard member 40 having flared front edges 41 on both sides of the cutting chamber 31. In this construction, the grass along the edge of a building, or the like can be channelled into cutting the chamber 31. The retainer member 36 of the front guard member 30 can be frictionally fitted over the motor housing 16, as seen in FIGS. 1 and 2, whereby a detachable full circle guard arrangement for operation protection can be used in connection with the mono-filament line cutting mechanism 28 of FIG. 2, or a rigid blade. In the present arrangement, with a "full circle" guard, objects that are contacted by the cutting member are generally diverted downward, in a direction away from the operator or passerby. Furthermore, the cutting path is defined by the "full circle" guard. In addition, cutting efficiency is improved with tines, as they support the resilient grass as the cutting member makes contact, allowing for a clean separation of grass blades, etc. The present construction also has the advantage that the fron guard 30 can be removed when trimming is required of grass or weeds up to the edge of, for example, a flower bed. The device, in this condition, is still safe to operate since the rear guard remains in place because it is integral with the main body 10, as well as a motor housing 16 of the grass/weed trimmer.

Another embodiment of the present invention is shown in FIGS. 5-8 in which like parts of the device shown in FIG. 1 bear the same reference numerals. However, the weed/grass/bush and evergreen trimmer shown in FIGS. 5 and 6 has a fixed full circle guard arrangement provided with two complimentary upper and lower portions 42 and 44, respectively. It should be noted that the full guard arrangement shown in FIGS. 5 and 6 provides 360 degree protection for the operator since there are only spaces of a limited size 46 between the tines 48 of both the upper and lower guard members. It should be also apparent that approximately 200 degrees of the arc in the front cutting diameter of the full circle guard is provided with the above mentioned tines having spaces, while the rest of the full circle guard remains closed, thus, providing a safety factor relative to the cutting area in the closest proximity to the operator. It should also be evident that the spacing 46 between the tines 48 are of such a size and dimension that the maximum size of an object passing therethrough to enter the cutting path is essentially controlled and limited to diminutive proportions.

As seen in FIG. 6, a further degree of safety for the operator can be utilized with the addition of a partial bottom cover plate 52 that is detachably mounted to the bottom portion of the cutting chamber 44. This arrangement, nevertheless, provides an access 54 for clean out or replacement of the cutting member of the device. The use of a bottom cover plate further restricts the possibility of unwanted objects from entering the cutting path of the present cordless trimmer.

As seen in FIGS. 7-12 the switch 14 shown in FIG. 1 is illustrated in greater detail. The switch 14 is shown as a one piece, dual action, safety interlock mechanism, referred to generally by the reference numeral 54, having a upper fixed contact arm 56 and lower movable and flexible arm 55. The downwardly projecting post 62 which normally rests on platform 64 when the switch 54 is in the non-operative condition can be moved laterally, as seen in FIG. 12, thus eliminating interference with platform 64. In this condition, as seen in FIG. 10, the lower switch member 66 rises to contact the fixed switch member 56 in order to make the switch operative.

FIG. 32 illustrates another embodiment of the on-off switch 14 shown in FIG. 10 having a finger actuated button 57 secured to a slide platform 59 movable on boss 61, as well as on positioning pin 63. The slide platform is provided with a semi-flexible trigger arm 65 having at the opposite end a safety lock-out tab 85, as well as a pressure pad 67. A printed circuit board 69 is provided with a contact 71 while a movable contact arm 73 has another contact 75. The slide platform 59 is also provided with downwardly projecting self-centering flex arms 77 and 79. Positioned between the flex arms 77 and 79 is a molded-in pin 81 which causes the flex arms to distort when moved in either a forward or rearward direction.

Thus, in operating the switch, the button 57 can be moved either forward or backward with enough force to overcome the resistance of the memory in the self-centering flex arms 77 and 79. As a result of the location of the stationary pin 81 one or the other flex arms is engaged with sufficient force to cause the bending of the flex arms. Consequently, when the switch assembly is moved a distance sufficient to permit the safety lock-out tab 85 to clear the interference rib 88 the semi-flexible trigger 65 can move upwardly carrying the pressure pad therewith to thereby move the contact arm 73 upwardly so that contact points 71 and 75 are engaged forming an electrical circuit which will energize the motor of the trimmer.

In order to de-activate the electrical circuit, finger pressure is released from the button 57 thereby causing the contact points 71 and 75 to separate and the safety lock-out tab 65 to retract by means of the spring action of the self-centering flex arms so that the trigger mechanism returns to its said rest or neutral position, and the interference rib 88 once again prevents the safety lock-out tab from moving from an interference position described hereinabove. It should be evident that because of the built-in memory of the self centering flex arms those arms will return to the original rest position when pressure is released from the button and the slide platform.

FIGS. 13-19 shows a hub assembly referred to generally by the reference numeral 26. The hub has a cylindrical shaft connector member 68 supporting a mounting hub 70 and a retainer cap 72. The latter is provided with a hinge swivel 74 which frictionally fits in the correspondingly shaped opening 76 of the swivel holder 78 on the mounting hub 70. The hub is also provided with a nesting groove 80 for the cutting line 28. Also located on the mounting hub 70 are upstanding locating pins 82 which fit through openings 84 in the retainer cap 72. As seen in FIG. 14, the mono-filament line 28 shows depressions 29 and contoured inner faces 83 of the locating pins 82 which are positioned in the depressions 29 and conform to configurations of the depressions. Consequently, the line 28 is precisely centered in the hub assembly resulting in a balanced cutting memeber and a positive mechanical lock is formed eliminating the tendency of the rotating line 28 to shift off center.

As seen in FIGS. 19-25 and alternate embodiment of the mounting hub is shown having a mounting hub 89 and a rotatable retainer cap 90 together with a cylindrical mounting shaft 68. The rotatable cap 90 is provided with a pair of opposing ramps 92, and rotating cap is rotated in a clockwise direction to lock the cap to the mounting hub, while it is rotated in a counter-clockwise direction to unlock the cap from the mounting hub. The rotating cap and mounting hub are shown in the assembled condition in FIG. 19 wherein the cutting line 28 is captured between the cap and the mounting hub in the groove 94. Furthermore, as seen in FIG. 22, the mounting hub is provided with retaining members 96 which are positioned opposite to each other and which are provided with a sloping bottom surface 98 whereby the turning of the rotatable cap 90 in a clockwise direction frictionally binds the ramps 92 within the retaining member 96.

A further embodiment of the invention 26 is shown in FIGS. 26-31 in which a cylindrical mounting shaft 100 is provided for the hub assembly which is shown supporting a mounting hub 102 and a retainer cap 104. Positioned on the mounting hub are a pair of spaced, upstanding retainer pins 106. Also shown in FIG. 28 is a cutting line retaining groove 108, as well as a groove 109 for securing a cutting blade 111. The retainer cap 104, as seen in FIGS. 29-31, is provided with downwardly projecting, and slightly flexible, tabs 110 which snap over the peripheral edges of the mounting hub 100. FIG. 26 shows the mounting hub and retaining cap in the assembled condition with locating pins 106 projecting through openings 112 is the retainer cap.

As herein before described with respect to FIG. 32, FIGS. 32-36 show the switch 14 in an alternate embodiment having a switch activator member which is shown in its neutral or lock-out position in FIG. 32. The switch activators provided with a finger operated top button 57 connected to a slide 59 which is adapted to move backwards and forward within the handle housing on the assembly boss 61 and pin 63. The switch activator provided with self centering flexarms 77 and 79 having a stationary pin 81 captured therebetween. The self centering flexarms 77 and 79 have a "memory" so that when they are bent either in the forward or reverse direction they will return to their initial relax position upon release fo the finger button 57. The switch activator is also provided with an integral semiflexible trigger 65 having a safety lock-out tab 85 and a pressure pad 67.

The switch arrangement particularly seen in FIG. 32 has a fixed circuit board 69 provided with a contact point 71 and a semiflexible contact arm 73 provided with a contact point 75.

The switch mechanism operates in the following manner:

After the top button 57 is slid forward or backward a sufficient distance in which the safety lock-out tab 85 clears the interference rib 88. The semiflexible trigger is caused to move in an upward direction whereby the pressure pad moves the semiflexible contact arm upward so that contact point 71 and 75 meet and the electric circuit is completed and energy from the battery is allowed to flow causing the motor shaft to rotate. In order to deactivate the circuit, finger pressure is released from the trigger 65, thus causing the contact point 71 and 75 to separate and the safety lock-out tab retracts since the flexarms return to the original rest position due to its built in "memory" forcing the trigger mechanism to return to its rest position and the interference rib 88 once again engages safety lock-out tab thereby preventing the pressure pad from moving upwardly against the semiflexible movable switch arm 73.

It should be apparent that all hub constructions of the present invention are dependent upon the pressure of the retainer cap against the cutting member, such as a cutting line or a cutting blade which can provide a snug and positive fit, and this is accomplished by a mechanical interlock as well as the material of the slightly resilient retainer cap which becomes slightly distorted when it meets with the mounting hub and traps a cutting member under the pressure of compression. Thus, the cutting member is securly held in position during the cutting operation.

It should be evident from the foregoing that the full circle guard arrangement of the present invention has many advantages, such as improved safety for the operator, or anyone in the vicinity of the cutting and trimming activity, and also reduced time and cost associated with replacement of the cutting members due to wear and tear, and abrasion of the cutting member by the same being impacted by rocks, walls, posts, etc. A further advantage of the present construction utilizing a full circle guard is that there is a longer segment of time for exposure within the cutting chamber of the grass clippings due to the impacting of the clippings on the guard and back into the cutting path of the cutting member, thus reducing the particle sizes due to a shredding or mulching action of the clippings. Furthermore, it provides somewhat of a restriction for the cut material, thus slowing it's exit from the cutting chamber and allowing the cutting member to repeatedly impart upon it, consequently further reducing the cut particle size to create a mulch that can more quickly degrade, and is less visually obvious.

With the full guard arrangement in use as shown and described herein, the unit is considered to be safer in operation than conventional reciprocating blade type power hedge trimmers.

While the invention has been disclosed and described herein with reference to several embodiments, it is apparent that other variations and modifications may be made which fall within the true spirit and scope of the invention as defined in the following claims.

I claim:

1. In a hand-held cordless grass/weed trimmer having a housing, a power source in said housing, a motor in said housing connected to said power source through a switch, a motor shaft, the improvement comprising; a motor hub removably attached to said motor shaft, a cutter element having a circular cutting path being a flexible cutting line or an interchangeable rectangular cutting blade, a mounting assembly for said cutter element on said motor hub having separate means for selectively holding said flexible cutting line or said retangular cutting blade by compression on said motor hub, and a guard member for said cutter element positioned adjacent to the cutting path of the cutter element.

2. A trimmer device as claimed in claim 1 wherein said curved guard member has a rear part integral with said housing, and a detachable front part.

3. A trimmer device as claimed in claim 2 wherein said detachable front part constitutes at least 200 degrees of an arc of a circle.

4. A trimmer device as claimed in claim 2 wherein said detachable front part is provided with a plurality of tines having spaces therebetween for restricting the size of objects passing therethrough into said cutting path.

5. A trimmer as claimed in claim 1 wherein said motor hub assembly comprises a mounting hub having a detachable mounting shaft operatively connected to said motor, and a movable retainer cap, said cutter element being removably held between said mounting hub and said retainer cap for rotational movement by said motor.

6. A trimmer as claimed in claim 5 wherein said retainer cap is rotatable and is provided with opposing ramps, said mounting hub being provided with oppositely disposed notches, each having a sloping surface whereby when said retainer cap is rotated in one direction each of said opposing ramps frictionally engage the respective sloping surface to thereby lock the cutter element on said mounting hub.

7. A trimmer as claimed in claim 5 further comprising means for pivotally mounting said retainer cap.

8. A trimmer device as claimed in claim 1 further comprising an interference rib, a switch member having a finger operated switch activator mounted for reciprocal movement, said switch activator provided with spaced flexible arms having a rest position in which the arms are substantially vertical and a stationary pin therebetween, a trigger arm connected to said switch activator having a safety lock-out tab engaging said interference rib and provided with a pressure pad, a pair of normally open switch contacts, whereby when said switch is moved in one direction said flex arms are bent out of their normal rest positions whereby said lock-out tab is disengaged from said interference rib causing said pressure pad to force said switch contacts together to a closed position to thereby actuate on electrical circuit, and when said switch activator moves back to its neutral position said flex arms are returned to their rest positions in which the switch contacts return to their open condition.

9. A trimmer device as claimed in claim 8 wherein said switch activator, spaced flexible arms, trigger arm and safety lock-out tab are fabricated as a one piece molded plastic part.

10. In a hand-held cordless grass/weed trimmer having a housing, a power source in said housing, a motor in said housing connected to said power source through a switch, a motor shaft, the improvement comprising; a motor hub removably attached to said motor shaft, a cutter element being a flexible cutting line or an interchangeable rectangular cutting blade, a mounting assembly for said cutter element on said motor hub having separate means for selectively holding said flexible cutting line or said rectangular cutting blade by compression on said motor hub, a circular guard member having complementary upper and lower halves each being provided with tines forming spaces therebetween which limit the size of objects passing through the spaces between said tines.

11. A trimmer device as claimed in claim 1 wherein said guard member has a fixed part and a fixed part which together are substantially circular in configuration and said detachable part has flared projections on opposite sides thereof for abutting against a structure to thereby cut and trim vegetation adjacent thereto.

12. In a hand-held cordless grass/weed trimmer having a housing, a power source in said housing a motor in said housing connected to said power source through a switch, a motor shaft, the improvement comprising: a motor hub removably attached to said motor shaft, a cutter element having a circular cutting path being a flexible cutting line or an interchangeable cutting blade, a mounting assembly for said cutter element on said motor hub having separate means for selectively holding said flexible cutting line or said rectangular blade by compression on said motor hub, a circular guard member having complementary upper and lower halves forming a cutting chamber with each half being provided with tines forming spaces therebetween which limit the size of objects passing through the spaces between said tines and a detachable partial bottom cover plate permitting access to said cutting chamber.

13. A trimmer device as claimed in claim 10 wherein said switch has an upper fixed contact arm and a lower movable contact arm, a switch activator having a switch finger control provided with a downwardly projecting post, a platform on said switch actuator, said post resting on said platform when said contact arms are separated, and when said finger control is pushed laterally off said platform said movable contact arm engages said fixed contact arm to thereby connect said motor to said power source.

14. In a hand held cordless grass/weed trimmer having a housing, a power source in said housing, and motor in said housing connected to said power source, and a switch for said power source, a motor shaft, the improvement comprising a motor hub removably attached to said motor shaft, a cutter element having a circular cutting path and being a flexible cutting line or an interchangeable rectangular cutting blade, a mounting assembly for said cutter element on said motor hub having separate means for selectively holding said flexible cutting line or said retangular cutting blade, a curved guard member for said cutter element positioned adjacent to said cutting path of said cutter element, said mounting hub assembly including a motor hub having a detachable mounting shaft operatively connected to said motor, a movable retainer cap, said cutter element being removably held between said mounting hub and said retainer cap for rotational movement by said motor, and wherein said mounting hub is provided with spaced, split locating pins each having an inside space, a nesting groove in said mounting hub and in the spaces between said split locating pins, said cutter element being a mono-filament line having depressions at spaced locations thereon and being positioned in said groove, and the inside spaces of said split locating pin being configured to be pressed into said depressions in the line in order to center said line on said mounting hub, and to lock said line on said hub assembly thus preventing line shifting on said hub.

* * * * *

UNITED STATES PATENT AND TRADEMARK OFFICE
CERTIFICATE OF CORRECTION

PATENT NO. : 4,987,681
DATED : January 29, 1991
INVENTOR(S) : Arnold L. Sepke

It is certified that error appears in the above-identified patent and that said Letters Patent is hereby corrected as shown below:

Col. 2, line 13, "FIG. 4" should begine a new paragraph.

Col. 4, line 12, delete "fron" and insert --front--.

Col. 5, line 50, "memeber" should be --member--.

Col. 5, line 53, "and" should be --an--.

Col. 7, line 16, "impart" should be --impact--.

Signed and Sealed this

Fifth Day of October, 1993

BRUCE LEHMAN

Attest:

Attesting Officer

Commissioner of Patents and Trademarks